United States Patent [19]

Shaw

[11] 3,905,235
[45] Sept. 16, 1975

[54] ACOUSTIC DEVICE FOR MEASURING ROTATION RATES

[75] Inventor: Herbert J. Shaw, Stanford, Calif.

[73] Assignee: The United States of America as represented by the Secretary of the Navy, Washington, D.C.

[22] Filed: Dec. 3, 1973

[21] Appl. No.: 420,829

[52] U.S. Cl. .................................... 73/505; 73/518
[51] Int. Cl.² ......................................... G01P 3/44
[58] Field of Search......... 73/488, 505, 506, 67.5 R, 73/67.6, 518

[56] References Cited
UNITED STATES PATENTS 2,912,853    11/1959   Hanysz................................ 73/67.6
3,145,572    8/1964    Brindley.............................. 73/505
3,220,262    11/1965   Thompson, Jr. ..................... 73/505
3,232,120    2/1966    Ensley................................. 73/505
3,349,607    10/1967   Klindt................................. 73/67.5

Primary Examiner—Herbert Goldstein
Attorney, Agent, or Firm—R. S. Sciascia; Charles D. B. Curry

[57] ABSTRACT

An acoustic sensing device for measuring the angular velocity of a spherical body; preferably comprised of at least one input transducer and at least one output transducer. The acoustic wave column traverses the periphery of the spherical body from the input transducer to the output transducer when the spherical body is rotated. The rate of rotation is determined by the output signal received by the output transducer.

6 Claims, 4 Drawing Figures

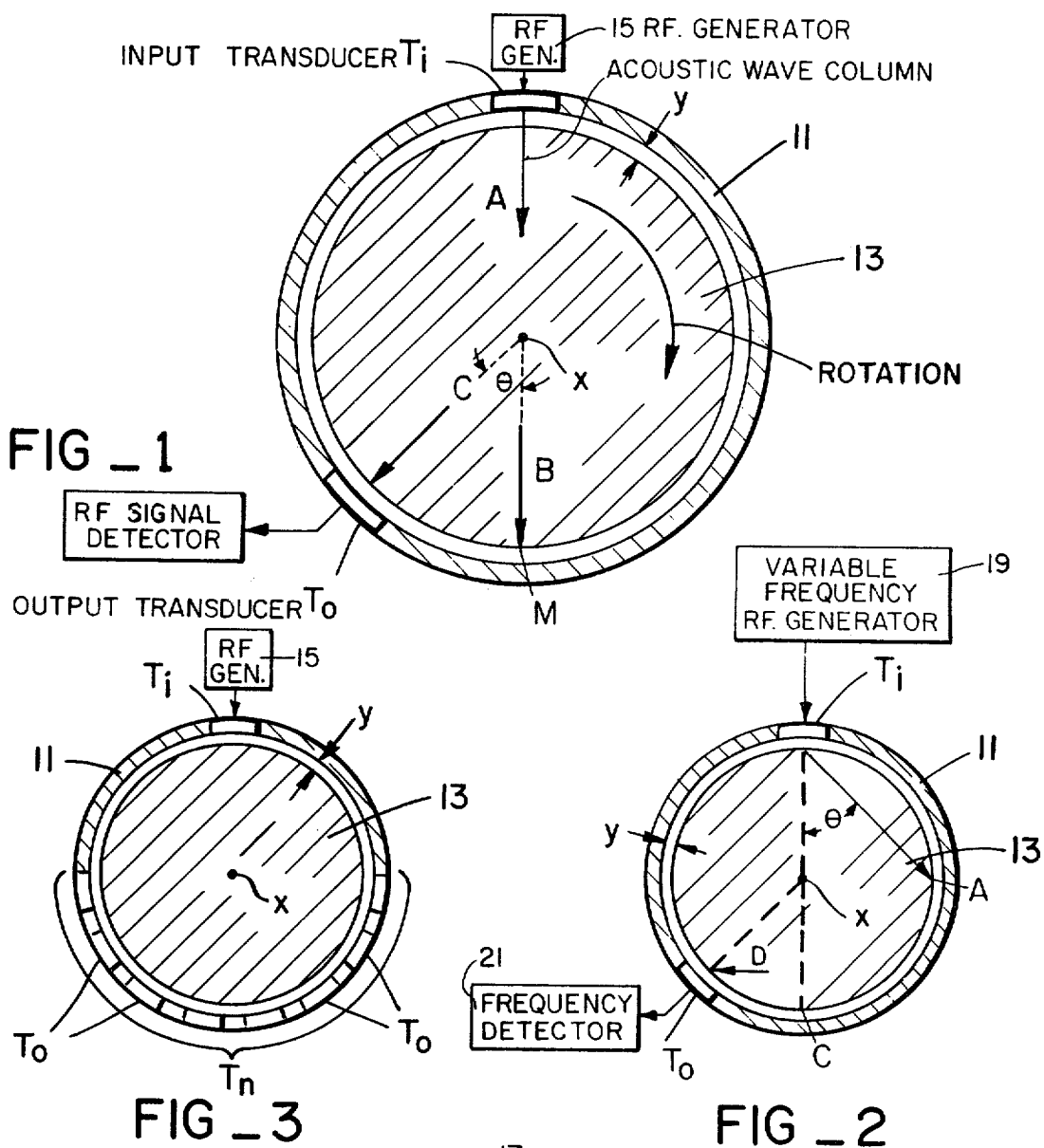
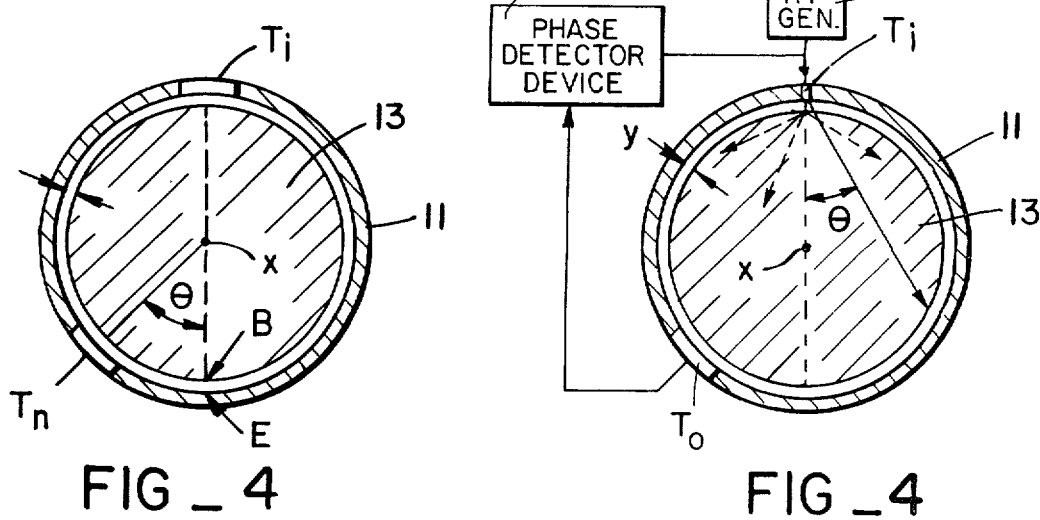
FIG_1
FIG_3
FIG_2
FIG_4
FIG_4

ACOUSTIC DEVICE FOR MEASURING ROTATION RATES

BACKGROUND OF THE INVENTION

1. Field of the Invention

The subject matter of the present invention relates generally to a device which measures the rate of rotation of a spherical body and more particularly a transducer system which measures the angular velocity of a spherical body by use of acoustic energy.

2. Description of the Prior Art

Many prior devices required surface marking or distortion of the spherical shape when measuring the angular velocity of a spherical body. Moreover, the equipment which was required was large and very cumbersome.

SUMMARY OF THE INVENTION

Briefly, the present invention is an acoustic sensing device for measuring the angular velocity of a spherical body; preferably comprised of at least one input transducer and at least one output transducer. The acoustic wave column traverses the periphery of the spherical body from the input transducer to the output transducer. When the spherical body is rotated, the rate of rotation is determined by the output signal received by the output transducer.

STATEMENT OF THE OBJECTS OF THE INVENTION

A primary object of the present invention is to provide a device which by use of acoustic surface waves can be used to measure the angular velocity of a spherical body.

Another object of the present invention is to provide a rotation rate measuring device which can be used as a gyro rotation sensor.

Another object of the present invention is to provide a device which does not require non-spherical distortion or surface marking.

Other objects, advantages and novel features of the invention will become apparent from the following detailed description of the invention when considered in conjunction with the accompanying drawings wherein:

BRIEF DESCRIPTION OF THE DRAWINGS

FIG. 1 is a cross-sectional view of both the sensor system and the rotating spherical body and illustrates an embodiment employing a bulk acoustic wave column and a single sensor device;

FIG. 2 is an illustration of a variable frequency embodiment of the present invention;

FIG. 3 is an embodiment employing a bulk acoustic wave and a plurality of sensor devices; and FIG. 4 illustrates a phase detection embodiment of the present invention.

DESCRIPTION OF THE PREFERRED EMBODIMENT

FIGS. 1 through 4 illustrate a sphere 13 rotating about center axis $x$; sphere mounting or housing 11 is spaced only a small distance $y$ radially from the surface of sphere 13. Sphere 13 may be mounted for rotation in housing 11 by any number of conventional methods. Sphere 13 and housing 11 may be a conventional gyroscope and its accompanying housing well known in the art; however, the concept is illustrated in general terms since the concept is not limited to a gyroscopic device but can be used wherever it is required to measure the rate of rotation of any spherical body or alternatively a cylindrical body rotating about its axis. In the FIG. 1 embodiment of the present invention the arrow A indicates a bulk acoustic wave column traveling downward into sphere 13. This wave column is excited by means of the input transducer $T_i$ which is shown.

In all of the embodiments of the present invention all transducers $T_i$, $T_o$, and $T_n$ are assumed to be located in the housing 11 and it is therefore not necessary to locate any physical structures either on the surface of sphere 13 or in its interior. The material of sphere 13 is preferably piezoelectric so that electric fields produced by input transducer $T_i$ can excite the acoustic wave column A of FIG. 1. It is also possible to deposit a piezoelectric film, such as zinc oxide, on the surface of sphere 13 so that non-piezoelectric material can be used for sphere 13 itself, if desired. More specifically, in all of these embodiments an RF voltage is applied to the input terminals of input transducer $T_i$ by means of RF generator 15. This causes input transducer $T_i$ to establish RF electric fields in the space immediately surrounding input transducer $T_i$. This RF electric field couples with the peripheral region of sphere 13 which is spaced from and adjacent to transducer $T_i$. Since the surface of sphere 13 is made of piezoelectric material, the local mechanical movement of the piezoelectric material causes the formation of an acoustic wave column that propagates towards the interior of the sphere 13.

In addition to the foregoing, it is well known to those skilled in the art that an input RF transducer $T_i$ having a wide aperture (with respect to the produced acoustic wave length) results in an acoustic columned beam described with respect to the embodiments of FIG. 1 and 3. As distinguished therefrom, an input RF transducer having a narrow aperture results in a radially diverging acoustic beam which is used in the embodiment of FIG. 4 as described below. Another known transducer design is one that produces a columnated beam whose direction of propagation is dependent upon the frequency of operation. This known transducer principle is employed in the embodiment of FIG. 2 of the present invention.

Referring to FIG. 1, if sphere 13 were stationary, the acoustic wave A would travel along a diameter of sphere 13 and would reach the opposite side of sphere 13 as the wave indicated by the arrow labeled B. However, if sphere 13 rotates clockwise as indicated the acoustic column will be carried around by sphere 13 as it rotates, and it will impinge on the surface of the sphere as indicated by the arrow labeled C. The location of the arrow C around the periphery of sphere 13 will depend on the rate of rotation, the sphere diameter and the material from which the sphere is made as described more fully below.

In the embodiment shown in FIG. 4, the input transducer $T_i$ is designed to approximate a point source which radiates a radially diverging acoustic beam. The phase of the signal received at the output transducer $T_o$, with respect to the phase of the signal $\theta$ at the input transducer $T_i$, then depends on the rotation rate. The radially diverging acoustic beam can be produced by any number of well known acoustic transducers available. The output signal could then be applied to a phase detector device 17 to indicate the angular velocity of sphere 13.

In another embodiment, let the wave from the input transducer $T_i$ be a collimated wave; the direction of travel of the wave excited at A is made to depend on the frequency of the excitation applied to the input transducer $T_i$ so that the wave does not travel radially inward but is deflected from that direction as indicated in FIG. 2. Then if this direction is chosen properly the wave will impinge on the output transducer $T_o$ as indicated by the arrow labeled D. In this case the proper direction for the wave is dependent on the velocity rotation of sphere 13. Thus, by sweeping the frequency of the signal applied to the input transducer $T_i$ by variable frequency RF generator 19 and looking for the frequency which produces maximum output at fixed output transducer $T_o$ by frequency detector 21 a determination of the rotation rate of sphere 13 will be given.

Referring specifically to FIG. 3, a plurality $T_n$ of output transducers $T_o$ may be used to determine the rate of rotation, where $T_n$ is a plurality of output transducers $T_o$, and where the beam radiated from $T_i$ is a collimated beam. The rate of rotation is determined by which output transducer $T_o$ of the plurality of output transducers $T_n$ receives the signal.

FIG. 1 illustrates sphere 13 which rotates freely within a sorrounding close fitting housing 11, the gap between the sphere and the enclosure being finite but very small. Sphere 13 has diameter D. $T_i$ and $T_o$ are the input and output transducers which form the transducer array mounted on housing 11. The input transducer $T_i$ is used to excite bulk waves which propagate into the interior of sphere 13, arriving at point M after a time delay $T = D/V$ where D is the diameter of sphere 13 and V is the velocity of the acoustic waves in the material of which sphere 13 is constructed. If sphere 13 rotates clockwise the waves will arrive at some point on the outer periphery displaced clockwise from point M. If $\Omega$ is the angular velocity of sphere 13 then the waves will arrive at output transducer $T_o$ if $\Omega T = \theta$, where $\theta$ is the angular displacement of transducer $T_o$ from point M as shown in FIG. 1, or $\Omega = V\theta/D$.

Referring to FIG. 2, let the properties of the input transducer array $T_i$ be such that the acoustic beam arrives at point A rather than point C. The frequency required for the wave to appear at output transducer $T_o$ will be a measure of the rate of rotation of sphere 13.

We have $\theta = \frac{1}{2}$ arc AC. Then the increment in velocity $\Delta\Omega$ required for the acoustic beam to be received by output transducer $T_o$ will be given by $\Delta\Omega = 2V\phi/D$. If now the angle $\theta$ is a function of the frequency $\omega$ of the signal used to excite input transducer $T_i$ then this last equation shows that the velocity of rotation of sphere 13 can be determined from the frequency required to make the acoustic beam strike output transducer $T_o$.

Looking at some quantitative values let us first determine the angle $\theta$ associated with an assumed rotation rate. Take $\Omega = 10^3$ cycles/second (Hz) = 60 K rpm = $2\pi$ $10^3$ radians/second, $v = 10^4$ centimeters per second, $D = 1$ centimeter. We have $\theta = D\Omega/V = 0.2\pi$ radians. We see that to obtain a substantial value of $\theta$ we require a material of low acoustic velocity for sphere 13.

In another mode of operation assume that we have steered the acoustic beam to output transducer $T_o$ by setting the frequency of the acoustic wave to give the necessary angle $\theta$. Then since the acoustic beam has finite width there will be an output signal from output transducer $T_o$ over a certain range of rotation rates as the output beam sweeps across output transducer $T_o$ as a function of rotation rate over a limited range. Over this range there will be a phase variation between the input signal at input transducer $T_i$ and the output signal from output transducer $T_o$ as a function of rotation rate and this could be used a measure of variation in rotation rate.

The device described above can use conventional acoustic devices which store and recognize signals or the like to determine the rate of rotation in any spherical body and more particularly to gyroscope measurements as involved in initial guidance systems.

A particular family of acoustic devices which may be used is described in the October 1972 *Scientific American* in an article titled "Acoustic Surface Waves" written by Gordon S. Kino and John Shaw.

The device and concept described above makes use of the slow propagation velocity of acoustic waves in solids as the waves propagate through or around rotating sphere 13. The instantaneous phase and/or polarization with respect to some fixed point on housing 11 is influenced by the motion of sphere 13. For example, the lower the velocity of propagation of the wave the larger the effect of the motion upon the wave.

A spherical rotor which is located within housing 11 which surrounds sphere 13 may be used to provide the rotation of sphere 13 at some angular velocity about axis x at some orientation in space. The transducers $T_i$, $T_o$ or $T_n$ are located within housing 11 and are not in physical contact with sphere 13.

What is claimed is:

1. An acoustic sensing device for measuring the angular velocity of a rotating spherical body comprising:
  a. at least one input transducer;
  b. at least one output transducer;
  c. a housing radially encompassing and spaced from the periphery of said spherical body;
  d. said input transducer and said output transducer located in said housing respectively at first and second positions;
  e. the outer surface of said spherical body comprising piezoelectric material;
  f. first means for applying RF energy to said input transducer;
  g. second means for detecting RF signals sensed by said output transducer; whereby
  h. said RF energy applied to said input transducer results in RF electric fields in the space immediately surrounding said input transducer that couple with said piezoelectric material adjacent said first position that causes the formation of an acoustic wave that propagates towards the interior of said spherical body and impinges upon said piezoelectric material of said spherical body adjacent said second position that is sensed by said output transducer thereby denoting the angular velocity of said spherical body.

2. The device of claim 1 wherein:
  a. said input transducer has a wide aperture and generates an acoustic columned beam.

3. The device of claim 1 wherein:
  a. said input transducer has a narrow aperture and generates a radially diverging acoustic beam.

4. The device of claim 3 wherein:
  a. said second means is a phase detector device having first and second inputs;

b. the output of said first means being connected to said first input and the output of said output transducer connected to said second input.

5. The device of claim 1 wherein:
a. said input transducer has a columated beam whose direction of propagation is a function of input frequency.

6. The device of claim 5 wherein:
a. said first means ia a variable frequency RF generator; and
b. said second means is a frequency detector.

* * * * *